United States Patent [19]

Sawaguchi et al.

[11] Patent Number: 5,744,541
[45] Date of Patent: Apr. 28, 1998

[54] COPOLYMER OF POLYPROPYLENE AND ORGANOPOLYSILOXANE AND METHOD FOR PREPARATION THEREOF

[75] Inventors: Takashi Sawaguchi, Kanagawa; Manabu Seno, Tokyo; Teruhito Maruyama, Kanagawa, all of Japan

[73] Assignee: Dow Corning Asia, Ltd., Tokyo, Japan

[21] Appl. No.: 837,197

[22] Filed: Apr. 14, 1997

[30] Foreign Application Priority Data

Apr. 15, 1996 [JP] Japan ................................ 8-092463
Apr. 15, 1996 [JP] Japan ................................ 8-092464

[51] Int. Cl.$^6$ ............................ C08F 283/00; C08F 8/00
[52] U.S. Cl. ...................... 524/588; 525/105; 525/479
[58] Field of Search ............................ 525/105, 588; 524/588

[56] References Cited

U.S. PATENT DOCUMENTS 4,526,953  7/1985  Dallavia, Jr. .
4,977,200  12/1990  Itoh et al. ................................ 523/223

FOREIGN PATENT DOCUMENTS 1016512  7/1962  European Pat. Off. .
0 254 050  1/1988  European Pat. Off. ........ C08G 77/38

Primary Examiner—Morton Foelak
Attorney, Agent, or Firm—Alexander Weitz

[57] ABSTRACT

There is disclosed a method for the preparation of a copolymer of polypropylene and organopolysiloxane, the method comprising heating a solution of an $\alpha,\omega$-diene-propylene polymer and an organohydrido polysiloxane having on average at least two SiH groups in one molecule at a temperature below the boiling point of the solvent. Preferably, the $\alpha,\omega$-diene-propylene polymer is obtained by subjecting polypropylene to thermal decomposition in an inert atmosphere at a pressure below atmospheric pressure.

20 Claims, No Drawings

COPOLYMER OF POLYPROPYLENE AND ORGANOPOLYSILOXANE AND METHOD FOR PREPARATION THEREOF

FIELD OF THE INVENTION

The present invention relates to a copolymer of polypropylene and organopolysiloxane and a method for the preparation thereof.

BACKGROUND OF THE INVENTION

It is well known that at the present time polyorganosiloxane finds application as a typical silicone-type polymer. Since the aforementioned silicone-type polymer has a specific molecular structure, its application is limited by properties inherent in such silicone-type polymers. For example, some silicone polymers possess excellent heat-resistant properties, but at the same time they have other unsatisfactory properties. Therefore, in many cases the aforementioned heat-resistant properties of such silicone polymers remain unexploited.

SUMMARY OF THE INVENTION

The present invention is based on a finding that a specific hydrocarbon-type polymer has high reactivity with respect to SiH groups of an organohydrido polysiloxane. As a result of this reaction, a silicone-type polymer that possesses properties of a hydrocarbon-type polymer is obtained. More specifically, the present invention relates to manufacturing a copolymer of polypropylene and organopolysiloxane, characterized by the fact that an α, ω-diene-propylene polymer and an organohydrido polysiloxane having on average at least two SiH groups in one molecule are dissolved in a solvent and then heated to a temperature below the boiling point of the solvent and caused to react with one another. Since the copolymer of polypropylene and organopolysiloxane of the present invention has a structure defined by a polysiloxane structural portion and a polypropylene structural portion and since both these structural portions are bonded to form a block, the copolymer incorporates properties of both a silicone-type polymer and a hydrocarbon-type polymer. Such properties greatly broaden the scope of practical application of the copolymer.

The present invention has been disclosed in Japanese Patent Application Numbers Hei 08/092463 and Hei 08/092464, the full disclosure of which are hereby incorporated by reference.

DETAILED DESCRIPTION OF THE INVENTION

The method of the present invention consists in manufacturing a copolymer of polypropylene and organopolysiloxane by dissolving an α, ω-diene-propylene polymer and an organohydrido polysiloxane, having on average two or more SiH groups in one molecule, in a solvent and then heating the solution to a temperature below its boiling point and causing a reaction between the components in the presence of a hydrosilylation catalyst.

Organohydrido Polysiloxane

It is recommended, although without special limitations of the structure, that the organohydrido polysiloxane have on average two or more than two SiH groups in one molecule. In particular, irrespective of the state of the SiH group, the organohydrido polysiloxanes of the types given below can be used.

(1) Organohydrido polysiloxane having at least one SiH group as a terminal group represented by the following formula (A):

  Formula (A)

It is recommended in general that the organohydrido polysiloxane have two or more than two terminal groups represented by formula (A), but preferably has the following formula (1):

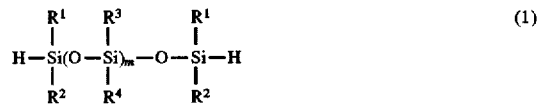

where $R^1$ is a methyl group, $R^2$ is a methyl group, $R^3$ is an aryl group or an alkyl group with 1 to 5 carbon atoms, $R^4$ is an aryl group or an alkyl group with 1 to 5 carbon atoms and m is an integer greater than 0.

It is preferred that in the aforementioned $R^3$ and $R^4$ are methyl groups. Organohydrido polysiloxanes of the above type may differ depending on manufacturing conditions, such as a reaction temperature, a reaction time, a type of a solvent used in the reaction, but in general they should have a degree of polymerization (m) within the range of 10 to 2,000, preferably between 20 and 1,000.

(2) Organohydrido Polysiloxane Having a Bivalent Siloxane Unit, Wherein at Least One SiH Group is Represented by Formula (B):

  Formula (B)

It is recommended that in general this organohydrido polysiloxane have two or more than two siloxane groups represented by aforementioned formula (B), and more specifically it can be a compound represented by formula (2) given below.

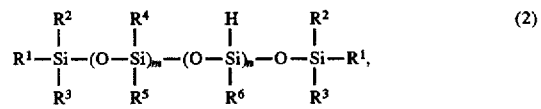

where $R^1$, $R^2$, $R^3$ are alkyl groups having 1 to 5 carbon atoms, $R^6$ is a methyl group, $R^4$, $R^5$ are aryl groups or alkyl groups having 1 to 5 carbon atoms, m is an integer having a value of 0 or greater, n is an integer equal to or greater than 2.

(3) Organohydrido Polysiloxane, Wherein at Least One SiH Group is a Terminal Group Represented by Formula (A) and Another Group is a Bivalent Siloxane Unit Represented by Formula (B)

The aforementioned organohydrido polysiloxane may be represented, e.g., by the general formula (3) given below.

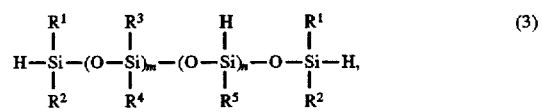

where:
$R^1$, $R^2$ are methyl groups;
$R^3$, $R^4$, and $R^5$ are aryl groups or alkyl groups having 1 to 5 carbon atoms;
m is an integer equal to 0 or greater than 0;
n is an integer equal to or greater than 2.

(4) Cyclic Organohydrido Polysiloxane, Wherein at Least One SiH Group is a Bivalent Siloxane Unit Represented by Formula (B)

A specific example of this organohydrido polysiloxane is a compound represented by formula (4) given below.

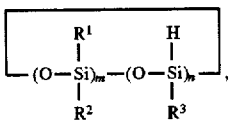

wherein $R^1$, $R^2$, $R^3$ are methyl groups;

m is an integer equal to or greater than 0;

n is an integer equal to or greater than 2;

(5) Organohydrido Polysiloxane Wherein at Least One SiH Group is a Bivalent Siloxane Unit of Formula (B) in a Chain Branched from the Main Chain in a Polyorganosiloxane Combination This aforementioned organohydrido polysiloxane has a siloxane unit represented by formula (C) given below.

 Formula (C)

where $R^a$ is a polyorganosiloxane group having at least one siloxane unit represented by the following formula: —OSiH($CH_3$)—, and $R^b$ is an aryl group or an alkyl group with 1 to 5 carbon atoms. A specific example of such organohydrido polysiloxane may be represented by formula (5) given below.

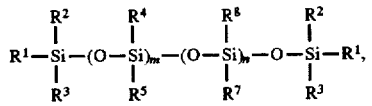

where:

$R^1$, $R^2$, and $R^3$ are alkyl groups with 1 to 5 carbon atoms;

$R^4$ and $R^5$ are aryl groups or alkyl groups having 1 to 5 carbon atoms;

$R^6$ is an alkyl group with 1 to 5 carbon atoms;

$R^7$ is a polyorganosiloxane represented by formula (6);

m is an integer equal to or greater than 0;

n is an integer equal to or greater than 2.

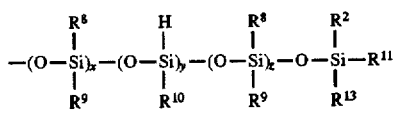

where:

$R^8$, $R^9$ are separate alkyl groups with 1 to 5 carbon atoms;

$R^{10}$ is a methyl group;

$R^{11}$, $R^{12}$ are methyl groups;

$R^{13}$ is a methyl group or hydrogen atom;

x is an integer greater than 0;

y is an integer equal to or greater than 1 (when $R^{13}$ is a methyl group, y is an integer equal to or greater than 2); and z is an integer equal to or greater than 1.

α, ω-Diene-Propylene Polymer

A substance that reacts with the aforementioned organohydrido polysiloxane is an α, ω- diene-propylene polymer. As described, e.g., in Japanese Laid-Open Application (Kokai) 55-84302, it can be obtained by subjecting a polypropylene polymer to a thermal decomposition reaction. For example, non-volatile products contained in a compound obtained as a result of thermal decomposition of polypropylene polymer having a molecular weight below 300000 with repeated splitting of the aforementioned polymer can be used for the above purpose. It is recommended that such thermal decomposition of the polypropylene be conducted by treating the starting material in the atmosphere of an inert gas, e.g., at a temperature of 300° to 450° C., for 0.5 to 4 hours, and at a pressure below 300 mmHg. As a result of the aforementioned thermal decomposition, a tertiary polymer radical is formed due to withdrawal of a tertiary hydrogen atom from the starting polypropylene polymer, and because this process is followed by β-scission, an isopropenyl group [$CH_2$=C($CH_3$)—] is formed. Repetition of the aforementioned splitting reaction leads to a formation of an α, ω-diene-propylene polymer having isopropenyl groups on its both terminals. Gas suitable for obtaining an inert-gas atmosphere may be represented by nitrogen, helium, or the like.

If, during the aforementioned thermal-decomposition, the splitting reaction proceeds very quickly, especially under the effect of high reaction temperatures, a large amount of material having volatile properties at room temperature is produced. In view of the above, it is recommended that the aforementioned thermal decomposition treatment be conducted at a reaction temperature within the range of 350° to 420° C. during a reaction time of 0.5 to 2 hours.

The aforementioned thermal decomposition treatment results in the formation of an α, ω-diene-propylene polymer typically having a (number average) molecular weight below 50000. When, however, the aforementioned thermal decomposition proceeds too far and leads to the formation of the α, ω-diene-propylene polymer with a molecular weight below 1,000, this low-molecular-weight polymer tends to evaporate and therefore its ability to react with the organohydrido polysiloxane is impaired. For the above reason, it is recommended that the aforementioned α, ω-diene-propylene polymer have a molecular weight within the range of 1,000 to 50,000, and for practical purposes, within the range of 2,000 to 30,000. The low-molecular polymer can be removed, e.g., by purification with the use of a mixture of hot xylene and methyl alcohol. The α, ω-diene-propylene polymer has isopropenyl groups at both terminals. This polymer may have microtacticity with an isotactic structure, syndiotactic structure, or an atactic structure.

According to the method of the present invention, the organohydrido polysiloxane and α, ω-diene-propylene polymer are dissolved in an appropriate solvent and caused to react with each other in the presence of a hydrosilylation catalyst with heating to a temperature below the boiling point of the solvent. As a result, a copolymer of polypropylene and organopolysiloxane is obtained. There are no special limitations with regard to the solvent suitable for dissolving the α, ω-diene-propylene polymer and organohydrido polysiloxane. Normally, aromatic and chlorine-type solvents are used. The following are specific examples of such solvents: toluene, xylene, benzene, chlorobenzene, chloroform, and the like. There are also no special limitations with regard to a hydrosilylation catalyst suitable for the purposes of the present invention and a conventional catalyst of this type may be used. The following are specific examples of such catalysts: chloroplatinic acid, platinum tetrachloride, complexes of olefin with chloroplatinic acid, complexes of chloroplatinic acid with methylvinylsiloxane, and the like. Likewise, there are no special limitations with regard to the ratio of the organohydrido polysiloxane and the α, ω-diene-propylene polymer, so that the selection of the above ratio is arbitrary. Various copolymers of polypropylene and organopolysiloxane may be obtained by utilizing various organohydrido polysiloxanes, α, ω-diene-propylene polymers, varying the proportions of these components, or reaction conditions. The temperature to which the organohydrido polysiloxane and α, ω-diene-propylene polymer are heated in the aforementioned hydrosilylation reaction should be lower than the boiling temperature of the solution used in the reaction. In general, there are no special limitations with the regard to this temperature, provided it ensures efficient progress of the desired reaction.

Basically, the obtained copolymer of the organohydrido polysiloxane and α, ω-diene-propylene polymer has an (—A—B—) structure consisting at least of a polypropylene-origin block A and an organopolysiloxane-origin block B. More specifically, it has a block-copolymer structure defined by repeated units of the (—A—B—) type and/or repeated units of the (—A—B—) type. Thus, the aforementioned copolymer of polypropylene and organopolysiloxane acquires properties of a silicone-type polymer due to its organopolysiloxane structural portion and properties of a hydrocarbon-type polymer due to its polypropylene structural portion. As a result, a silicone-type polymer having a broader scope or practical application is obtained.

PRACTICAL EXAMPLES

The invention will be further described with reference to practical examples, which, however, should not be construed as limiting.

Example 1

Commercially available isotactic polypropylene (a product of Sumitomo Chemical Industries Co., Ltd. [NOBLEN H101]) was purified through precipitation with the use of a mixed solvent consisting of hot xylene and methyl alcohol. While being boiled in a flow of gaseous nitrogen, the product was continuously treated for 70 hours with n-heptane, whereby a purified polypropylene polymer was obtained.

One gram of the aforementioned purified polypropylene polymer was loaded into a heat-resistant flask, and while the product was stirred under a reduced pressure of 3 mmHg and in a flow of gaseous nitrogen, it was heated. When the temperature reached 250° C., the flask was immersed into a metal bath maintained at 370° C., where the product was subjected to thermal decomposition as it was maintained in a flow of gaseous nitrogen at the aforementioned temperature for 90 minutes. Following this, the product was cooled with liquid nitrogen, a nonvolatile polymer that remained in the flask was combined with 10 ml of xylene and dissolved in it. The obtained solution was added by dripping to 50 ml of methyl alcohol and purified by reprecipitation. The solid substance produced in the above process was washed five times with 50 ml of methyl alcohol and treated in vacuum at 40° C. As a result, an α, ω-diene-propylene polymer was obtained. This polymer was designated (IPP-1).

The aforementioned propylene polymer (IPP-1) was subjected to the following analyses:

(1) Determination of Molecular Weight

Type of Measuring Instrument: high-temperature GPC/SEC system SSC-7100 (a product of Senshu Kagaku Co., Ltd.)

Column: GPC-3506 (displacement-limit molecular weight—20 million, 8.0×500 mm) (a product of Senshu Kagaku Co., Ltd.)

High-Temperature Filter Device: high-temperature filter unit SSC-9300 (operating at 180° C.) (a product of Senshu Kagaku Co., Ltd.)

(2) $^{13}$C NMR Spectrum Measurements

Type of Measuring Instrument: Spectrometer JEOL JNM-GX400 (a product of Nippon Denshi Co., Ltd.)

Measuring Conditions: 399.65 MHz/110° C. (inner-lock type)

Sample Solution: concentration 10% (weight/volume), solvent—a 2:1 volumetric ratio mixture of 1,2,2,2-tetrachloroethane (TCE) and TCE-d$_2$ (3) Measurement of Melting Point (Tm) and Heat of Fusion (ΔH)

Type of Measuring Instrument: DSC220 (a product of Seiko Denshi Co.)

Measuring Conditions: in a flow of gaseous nitrogen, heating rate—5.0° C./min (4) $^1$H NMR Spectral Measurements Type of Measuring Instrument: Spectrometer JEOL JNM-GX400 (a product of Nippon Denshi Co., Ltd.)

Measuring Conditions: 399.65 MHz/110° C. (inner-lock type)

Sample Solution: concentration 10% (weight/volume), solvent—a 2:1 volumetric ratio mixture of 1,2,2,2-tetrachloroethane (TCE) and TCE-d$_2$ (5) Functionality Functionality (ft) is the average number of terminal double bonds (i.e., isopropenyl groups) per 1 molecule and was obtained by the following formula:

$$ft = I_{TVD}/((I_{TVD}+I_{n-pr})/2)$$

where $I_{TVD}$ is the methyl signal intensity in the $^{13}$C NMR spectrum of the isopropenyl group, and $/(I_{TVD}+I_{n-pr})$ is the methyl signal intensity in the $^{13}$C NMR spectrum of all terminal groups.

(6) Microtacticity

Microtacticity was determined from a relative intensity of triplet peaks of methyl groups excluded from peaks of all terminals in the $^{13}$C NMR spectrum.

Results are shown in Table 1.

Example 2

An α, ω-diene-propylene polymer was obtained by the same method of synthesis as in Example 1, but with the use of a commercially available syndiotactic polypropylene (a product of Mitsui Toatsu Chemical Co., Ltd., SPT-0071). The obtained polymer was designated SPP-2.

The propylene polymer SPP-2 was analyzed in the same manner as propylene polymer IPP-1. Results are shown in Table 1.

Example 3

A four-neck flask having 200 ml capacity and equipped with a condenser, glass cap, thermometer, and a mechanical stirrer was filled with 63.0 g of octamethyl cyclotetrasiloxane, and a mixture of 0.9 g of 1,1,3,3-tetramethyl disiloxane with 2.0 g of activated clay as a catalyst. The contents of the flask were heated for 60 min at 80° C. in a flow of gaseous nitrogen, and then a reaction was carried out as the above temperature was maintained for another 10 hours. Upon completion of the reaction, the catalyst was removed by filtering, and the residual monomer was removed by heating the filtrate under a reduced pressure. As a result, a dimethylhydrodiene polysiloxane having SiH(CH$_3$) (CH$_3$) end groups was obtained. This product was designated PDMS-1. The product was obtained in an amount of 51 g with the yield of 80 wt. %. In the aforementioned formula (1), the obtained PDMS-1 had m equal to about 104.

Characteristics of PDMS-1 were as follows:
(1) $^1$H NMR Spectrum (Kizoku Co., a value of chemical shift from TMS (tetramethylsilane) (ppm), relative intensity);
$(CH_3)_2SiO$ of the polysiloxane main chain: near the area of 0.051 (range from 0.039 to 0.074) and 13.571;
$(CH_3)_2Si$ on both terminals of hydrosilyl: 0.161, 0.1703, and 0.248;
SiH on both terminals of hydrosilyl: near the area of 4.683 (range from 4.664 to 4.701)
(2) SiH functionality (determined by measuring $^1$H NMR Spectrum)=2

Example 4

Dimethyl hydrodiene polysiloxane having $SiH(CH_3)$ $(CH_3)$ groups was prepared by the same method as in Example 3. The product was designated (PDMS-2). In aforementioned formula (1) the PDMS-2 had m equal to about 63.

Practical Example 1

A 100 ml capacity four-neck flask equipped with a condenser, glass cap, thermometer, and a mechanical stirrer was filled with 0.8 g (0.50 mmol) of the aforementioned IPP-1 polymer and 2.4 g (0.58 mmol) of the aforementioned PDMS-1 polysiloxane. The contents of the flask were then dissolved in 30 ml of toluene at 100° C. in a flow of gaseous nitrogen. The solution was combined with a 1 wt. % concentration solution of a hydrosilyation catalyst in the form of hexachloroplatinic acid $(H_2PtCl_6).6H_2O$ in 2-propyl alcohol, the solution being introduced with a microsyringe. The molar ratio of platinum to terminal double bonds was 1:1200.

The above mixture was heated for 90 min. at 110° C. and then diluted with 20 ml of toluene. The obtained mixture was filtered and added by dripping to 250 ml of ethyl alcohol. The resulting precipitated solid substance was separated and washed with ethyl alcohol, heated and dried in vacuum. As a result, 2.1 g of a copolymer of an isotactic polypropylene and organopolysiloxane were obtained. The yield was 66 wt. %. This product was designated "Copolymer 1".

Practical Example 2

Two grams (2.0 g) of a copolymer of a syndiotactic polypropylene and organopolysiloxane were obtained in the same manner as Practical Example 1, with the exception that the aforementioned SPP-2 propylene polymer was used instead of the IPP-1 propylene polymer of Practical Example 1. The yield was 62 wt. %. The obtained product was designated "Copolymer 2"

Practical Example 3

A copolymer of an isotactic polypropylene and organopolysiloxane was obtained in the same manner as in Practical Example 1, with the exception that PDMS-2 was used instead of the PDMS-1 of Practical Example 1. The obtained product was designated "Copolymer 3".

Characteristics of the obtained Copolymers 1 through 3 are shown in Table 1. The values of molecular weights shown in Table 1 were all determined as molecular weights recalculated for polystyrene by means of calibration curves for standard polystyrene, and then recalculated to the molecular weight of polypropylene by means of a Q value (which is a molecular weight per unit chain length). (Q value is 26.4 for polypropylene, 41 for polystyrene; polypropylene-recalculated molecular weight=polystyrene-recalculated molecular weight x (26.4/41).

TABLE 1

| | Molecular weight | | Mw/ | Melting point [°C.] | Crystal heat of fusion ΔH | Functionality, | Microtacticity | | |
|---|---|---|---|---|---|---|---|---|---|
| | Mw × 10$^{-3}$ | Mn × 10$^{-3}$ | Mn | C | [J/g] | ft | mm | mr | rr |
| Pr. Ex. 1 | | | | | | | | | |
| IPP-1 | 7.87 | 3.25 | 2.42 | 151.7 | 93.0 | 1.85 | 0.89 | 0.06 | 0.05 |
| Copolymer 1 | 18.10 | 5.26 | 3.45 | 150.3 | 25.3 | — | 0.89 | 0.07 | 0.04 |
| Pr. Ex. 2 | | | | | | | | | |
| SPP-2 | 6.38 | 3.20 | 1.99 | 124.8 | 67.7 | 1.72 | 0.05 | 0.12 | 0.83 |
| Copolymer 2 | 16.20 | 4.90 | 3.30 | 124.8 | 9.7 | — | 0.06 | 0.12 | 0.83 |
| Pr. Ex. 3 | | | | | | | | | |
| IPP-1 | 7.87 | 3.25 | 2.42 | 151.7 | 93.0 | 1.85 | 0.89 | 0.06 | 0.05 |
| Copolymer 3 | 10.80 | 3.40 | 3.12 | 152.0 | 39.2 | — | \ | \ | \ |

With respect to the $^1$H NMR spectra of Copolymer 1, Copolymer 2, IPP-1 and SPP-2, the following observations were made:

Strong signals at 4.601 ppm and 4.662 ppm corresponded to two anisotropic double-bondable protons of terminal groups $(CH_2=C(CH_3)—CH_2—)$ in IPP-1 propylene polymer and SPP-2, respectively. However, only insignificant signals could be detected from the spectrum of Copolymer 1 and Copolymer 2.

A signal near 0.048 ppm caused by the protons of the dimethyl group in the main chain of PDMS-1 and a signal at 4.68 ppm caused by the protons of SiH were almost undetectable.

Similar results were obtained for Copolymer 3.

Analysis of the spectra clearly shows that Copolymer 1 is a block copolymer consisting of a polypropylene block (PP block) and an organopolysiloxane block (PDMS block). A relative intensity between PDMS block and PP block in Copolymer 1 was calculated as 1:0.65. Based on an assumption that molecular weights of block chains of two types in the copolymers are the same as molecular weights in the starting propylene polymer and organohydrido polysiloxane, the mole ratio of the organopolysiloxane block and the polypropylene block in Copolymer 1 can be calculated by means of the for formula given below and is equal to 0.8.

$$\text{Mole ratio} = \frac{(\text{Relative intensity of } PDMS \text{ block}) \times (\text{Average degree of polymerization of } PP \text{ block})}{(\text{Relative intensity of } PP \text{ block}) \times (\text{Average degree of polymerization of } PDMS)}$$

Furthermore, analysis of the spectra showed that the relative intensity between the organopolysiloxane block and the polypropylene block in Copolymer 2 was calculated as 1:0.55, and the mole ratio of the organopolysiloxane block to polypropylene block was 0.8.

Analysis of spectra obtained for Copolymer 3 showed a relative intensity between the organopolysiloxane block and the polypropylene block was calculated as 1:0.97 and a mole ratio of the organopolysiloxane block to polypropylene of 0.8.

The data obtained from the $^1$H NMR spectra of IPP-1 and Copolymer 1 was used for calculation of a relative intensity of the polypropylene main chain with respect to that of polypropylene unsaturated terminals (vinylidene groups). The comparison showed that when the value corresponding to IPP-1 is 1, the value corresponding to Copolymer 1 is 20. The obtained results showed that, in general, all terminal vinylidene groups in IPP-1 as a starting material are reduced to a level of about $\frac{1}{20}$. Thus it can be assumed that a major part of synthesized Copolymer 1 has at least both terminals of the polypropylene block, bonded to organohydrido polysiloxane. In a similar manner, a relative intensity of polypropylene main chains with respect to unsaturated terminals (vinylidene groups) was calculated for Copolymers 2 and 3. The calculations showed that a value equal to 1 in SPP-2 corresponded to a value equal to 14 in Copolymer 2. A value equal to 1 in IPP-1 corresponded to a value equal to 14 in Copolymer 3. The obtained results showed that, as compared to the starting material SPP-2, in Copolymer 2 the terminal vinylidene groups are reduced to a level of about $\frac{1}{14}$ and that, as compared to IPP-1, in Copolymer 3 the terminal vinylidene groups are reduced to the level of $\frac{1}{14}$. In other words, the results are similar to those obtained for Copolymer 1. Thus, a relative intensity of the polypropylene main chain with respect to the polypropylene terminals can be correctly determined from the $^1$H NMR spectra as a ratio of the intensity of the polypropylene main chain to the intensity of polypropylene terminals, and mainly as a ratio (6:2) of the number of protons in the polypropylene main chain to the number of protons at polypropylene terminals.

As can be seen from Table 1, the copolymer of polypropylene and organopolysiloxane made in accordance with the present invention has the same microtacticity and melting point as those of the α, ω-diene-propylene polymer of the starting material. On the other hand, the heat of fusion (ΔH) of crystals in the copolymer of the invention is significantly lower than that of the α, ω-diene-propylene polymer. This is evidence that the copolymer of polypropylene and organopolysiloxane made in accordance with the present invention is suitable for use as a material that combines properties of both polypropylene and organopolysiloxane.

As far as the heat of fusion (ΔH) of crystals is concerned, it can be noted that in the case of Copolymer 1 the experimental data (25.3 J/g) almost coincides with theoretical data (26.1 J/g, which is a product of the crystal heat of fusion of propylene polymer IPP-1 and the weight percent of polypropylene block chains in Copolymer 1). On the other hand, in the case of Copolymer 2, the experimental data (9.7 J/g) is lower than the theoretical data (19.0 J/g, which is a product of the crystal heat of fusion of propylene polymer SPP-2 and the weight percent of polypropylene block chains in Copolymer 2).

The obtained results suggest that the copolymer prepared from organopolysiloxane and polypropylene having an isotactic structure develops macrophasal separation, while the copolymer prepared from organopolysiloxane and polypropylene having a syndiotactic structure has polypropylene chains with stronger adhesion.

According to the method of the invention, an appropriate hydrosilylation reaction reliably proceeds between isopropenyl groups of the α, ω-diene-propylene polymer and SiH groups of organohydrido polysiloxane. Therefore, the obtained silicone-type copolymer is produced in a block-copolymer form that incorporates a polypropylene structural portion from the α, ω-diene-propylene polymer and an organopolysiloxane structural portion from organohydrido polysiloxane. As a result, the obtained copolymer combines properties of a silicone-type polymer and properties of hydrocarbon-type polymer and therefore may find wide practical application.

The aforementioned copolymer has the same melting point as a propylene polymer, has microstereospecificity, and at the same time incorporates properties of organopolysiloxane. This means that physical properties and chemical properties of the copolymer of the invention may be advantageously used in various fields. For example, it is suitable for the preparation of various thermoplastic elastomers, surface improvers, compatibility improvers, medicinal polymers, and the like.

What we claim is:

1. A method for preparing a copolymer of polypropylene and organopolysiloxane, said method comprising heating a solution of (I) an α, ω-diene-propylene polymer and (II) an organohydrido polysiloxane having an average at least two SiH groups in one molecule in (III) a solvent having a boiling point (b.p.), said heating being carried out at a temperature below said boiling point (b.p.).

2. The method according to claim 1, wherein at least one SiH group of said organohydrido polysiloxane (II) is a terminal group represented by the formula —SiH(CH$_3$)(CH$_3$).

3. The method according to claim 1, wherein said organohydrido polysiloxane (II) contains at least one siloxane unit represented by the formula —OSiH(CH$_3$)—.

4. The method according to claim 2, wherein said organohydrido polysiloxane (II) contains at least one siloxane unit represented by the formula —OSiH(CH$_3$)—.

5. The method according to claim 1, wherein said organohydrido polysiloxane (II) contains at least one siloxane unit represented by the formula —OSiR$^a$R$^b$—, in which R$^a$ is a polyorganosiloxane group having at least one siloxane unit represented by the formula —OSiH(CH$_3$)— and R$^b$ is selected from the group consisting of an aryl group and an alkyl group having 1 to 5 carbon atoms.

6. The method according to claim 2, wherein said organohydrido polysiloxane (II) contains at least one siloxane unit represented by the formula —OSiR$^a$R$^b$—, in which R$^a$ is a polyorganosiloxane group having at least one siloxane unit represented by the formula —OSiH(CH$_3$)— and R$^b$ is selected from the group consisting of an aryl group and an alkyl group having 1 to 5 carbon atoms.

7. The method according to claim 3, wherein said organohydrido polysiloxane (II) contains at least one siloxane unit represented by the formula —OSiR$^a$R$^b$—, in which R$^a$ is a polyorganosiloxane group having at least one siloxane unit represented by the formula —OSiH(CH$_3$)— and R$^b$ is selected from the group consisting of an aryl group and an alkyl group having 1 to 5 carbon atoms.

8. The method according to claim 1, , wherein said α, ω-diene-propylene polymer (I) is obtained by subjecting polypropylene to thermal decomposition in an inert atmosphere at a pressure below atmospheric pressure.

9. The method according to claim 2, wherein said α, ω-diene-propylene polymer (I) is obtained by subjecting polypropylene to thermal decomposition in an inert atmosphere at a pressure below atmospheric pressure.

10. The method according to claim 3, wherein said α, ω-diene-propylene polymer (I) is obtained by subjecting polypropylene to thermal decomposition in an inert atmosphere at a pressure below atmospheric pressure.

11. The method according to claim 5, wherein said α, ω-diene-propylene polymer (I) is obtained by subjecting polypropylene to thermal decomposition in an inert atmosphere at a pressure below atmospheric pressure.

12. A copolymer of polypropylene and organopolysiloxane prepared by a hydrosilation reaction between (I) an α, ω-diene-propylene polymer and (II) an organohydrido polysiloxane having an average at least two SiH groups in one molecule.

13. The copolymer according to claim 12, wherein said organohydrido polysiloxane (II) is represented by the formula

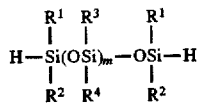

wherein R$^1$ and R$^2$ are methyl radicals, R$^3$ and R$^4$ are independently selected from the group consisting of aryl radicals and alkyl radicals having 1 to 5 carbon atoms and m is an integer with a value greater than 0.

14. The copolymer according to claim 13, wherein R$^3$ and R$^4$ are methyl radicals.

15. The copolymer according to claim 12, wherein said α, ω-diene-propylene polymer (I) is obtained by subjecting polypropylene to thermal decomposition in an inert atmosphere at a pressure below atmospheric pressure.

16. The copolymer according to claim 13, wherein said α, ω-diene-propylene polymer (I) is obtained by subjecting polypropylene to thermal decomposition in an inert atmosphere at a pressure below atmospheric pressure.

17. The copolymer according to claim 14, wherein said α, ω-diene-propylene polymer (I) is obtained by subjecting polypropylene to thermal decomposition in an inert atmosphere at a pressure below atmospheric pressure.

18. The copolymer according to claim 13, wherein m is 20 to 1,000 and said α, ω-diene-propylene polymer (I) has a number average molecular weight of 2,000 to 30,000.

19. The copolymer according to claim 14, wherein m is 20 to 1,000 and said α, ω-diene-propylene polymer (I) has a number average molecular weight of 2,000 to 30,000.

20. The copolymer according to claim 17, wherein m is 20 to 1,000 and said α, ω-diene-propylene polymer (I) has a number average molecular weight of 2,000 to 30,000.

* * * * *